US 6,623,122 B1

(12) United States Patent
Yamazaki et al.

(10) Patent No.: US 6,623,122 B1
(45) Date of Patent: Sep. 23, 2003

(54) LIGHT SOURCE OPTICAL SYSTEM AND PROJECTOR HAVING FIRST AND SECOND LAMPS OF DIFFERENT SPECTRAL DISTRIBUTIONS

(75) Inventors: Shunpei Yamazaki, Tokyo (JP); Masaaki Hiroki, Kanagawa (JP); Takeshi Fukada, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 40 days.

(21) Appl. No.: 09/675,715

(22) Filed: Sep. 29, 2000

(30) Foreign Application Priority Data

Sep. 30, 1999 (JP) ............................................ 11-278758

(51) Int. Cl.[7] ........................ G03B 21/26; G03B 21/14; H04N 9/12; G02F 1/00; F21V 9/00
(52) U.S. Cl. ............................ 353/30; 353/94; 353/84; 349/5; 349/7; 348/743; 348/760; 362/231; 362/234; 362/235
(58) Field of Search .......................... 353/94, 102, 31, 353/34, 37, 29, 84; 362/231, 234, 235; 349/517; 348/743, 760

(56) References Cited

U.S. PATENT DOCUMENTS

| | | | | |
|---|---|---|---|---|
| 4,641,227 | A | * 2/1987 | Kusuhara | 362/231 |
| 4,964,719 | A | 10/1990 | Tachikawa et al. | 353/85 |
| 5,580,142 | A | * 12/1996 | Kurematsu et al. | 353/31 |
| 5,594,569 | A | 1/1997 | Konuma et al. | 349/122 |
| 5,649,753 | A | 7/1997 | Masumoto | 353/102 |
| 6,109,752 | A | * 8/2000 | Itoh et al. | 353/98 |
| 6,252,636 | B1 | * 6/2001 | Bartlett | 348/743 |
| 6,336,724 | B1 | * 1/2002 | Shouji et al. | 353/20 |
| 6,505,939 | B1 | * 1/2003 | Bierhuizen et al. | 353/94 |
| 2001/0053078 | A1 | * 12/2001 | Ishikawa et al. | 362/238 |
| 2002/0015313 | A1 | * 2/2002 | Tiesler-Wittig | 362/554 |

FOREIGN PATENT DOCUMENTS

| | | | |
|---|---|---|---|
| EP | 683 425 A1 | 11/1995 | ............ G03B/21/10 |
| JP | 2-073241 | 3/1990 | ............ G03B/21/14 |
| JP | 4-053942 | 2/1992 | ............ G03B/21/14 |
| JP | 5-066501 | 3/1993 | ............ G03B/33/12 |
| JP | 8-036180 | 2/1996 | ......... G02F/1/1335 |
| JP | 9-127467 | 5/1997 | ............. G02F/1/00 |

OTHER PUBLICATIONS

Inui, S. et al, "Thresholdless Antiferroelectricity in Liquid Crystals and its Application to Displays," *J. Mater. Chem.*, vol. 6, No. 4, pp. 671–673, 1996.

Yoshida, T. et al, "A Full–Color Thresholdless Antiferroelectric LCD Exhibiting Wide Viewing Angle with Fast Response Time," *SID 97 Digest*, pp. 841–844, 1997.

Furue, H. et al, "Characteristics and Driving Scheme of Polymer–Stabilized Monostable FLCD Exhibiting Fast Response Time and High Contrast Ratio with Gray–Scale Capability," *SID 98 Digest*, pp. 782–785, 1998.

Yoshihara, T. et al, "Time Division Full Color LCD by Ferroelectric Liquid Crystal," *EKISHO*, vol. 3, No. 3, pp. 190–194, 1999.

(List continued on next page.)

*Primary Examiner*—Russell Adams
*Assistant Examiner*—Melissa J Koval
(74) *Attorney, Agent, or Firm*—Cook, Alex, McFarron, Manzo, Cummings & Mehler, Ltd.

(57) ABSTRACT

A light source optical system capable of forming an image having good balance in brightness of red, blue, and green color light, having high overall brightness, and having good color reproducibility, on a screen is provided. The light source optical system has a first lamp, a second lamp, and a condensing optical system for synthesizing a first light emitted from the first lamp and a second light emitted from the second lamp to form irradiation light. The light source optical system is characterized in that the first light and the second light have mutually differing spectral distributions.

28 Claims, 8 Drawing Sheets

OTHER PUBLICATIONS

English abstract re Japanese patent application No. 2-073241, published Mar. 13, 1990.

English abstract re Japanese patent application No. 4-053942, published Feb. 21, 1992.

English abstract re Japanese patent application No. 5-066501, published Mar. 19, 1993.

English abstract re Japanese patent application No. 8-036180, published Feb. 6, 1996.

English abstract re Japanese patent application No. 9-127467, published May 16, 1997.

1. Concise statement for Terada et al., "Half–V Switching Mode FLCD" Proceedings of the 46$^{th}$ Applied Physics Association Lectures, 28p–V–8, p. 1316, Mar. 1999.

* cited by examiner

LIGHT SOURCE OPTICAL SYSTEM AND PROJECTOR HAVING FIRST AND SECOND LAMPS OF DIFFERENT SPECTRAL DISTRIBUTIONS

BACKGROUND OF THE INVENTION

1. Field of the Invention

The present invention relates to a light source used in a projector which projects an image on a screen. Further, the present invention relates to a projector using the projector light source, and in particular, to a liquid crystal projector using the a liquid crystal panel.

2. Description of the Related Art

Techniques for manufacturing a semiconductor device in which a semiconductor thin film is formed on a low cost glass substrate, for example a thin film transistor (TFT), have been developing rapidly. The reason is the fact that the demand for an active matrix type liquid crystal panel becomes high.

A thin film transistor (pixel TFT) is arranged in each of several hundred thousands to several millions of pixels arranged in a matrix state in an active matrix type liquid crystal panel (liquid crystal panel). Electric charges inputted to a pixel electrode on each pixel is controlled by the pixel TFTs.

Furthermore, projecting type display panels using the liquid crystal panel, namely liquid crystal projectors, are rapidly increasing their presence in the marketplace. Reasons which can be given for this include better color reproduction, smaller size, lighter weight, and lower power consumption with the liquid crystal projector compared to a projector using a CRT.

The liquid crystal projector performing color display projects images corresponding to red, green, and blue colors, respectively, on a screen, either at the same time or in order, and forms a color image by transmitting red, green, and blue colored light, contained in white light from a light source, through the liquid crystal panel either at the same time or in order.

A method of irradiating white light to pixels of the liquid crystal panel, of absorbing unnecessary colors from the colors red, green, and blue contained in the white light by color filters contained in the pixels, and of transmitting the desired color of light to the pixels can be given as a method of displaying a color image by the liquid crystal projector.

Further, a method of separating white light into three primary colors (red, green, and blue) and then transmitting each color of light through the pixels can also be given. A method of using two or three dichroic mirrors can be given as a method of separating white light from a light source into the three primary colors of light (red, green, and blue). As an example, a first dichroic mirror reflects only light in a red color (R) wavelength range, for example, from white light emitted from the light source, and transmits other colors of light. A second dichroic mirror reflects only light in a green color (R) wavelength range, for example, out of light transmitted through the first dichroic mirror, and transmits the other color of light. Only light in blue color wavelength range is transmitted through the first and the second dichroic mirrors. White color light irradiated from the light source can be separated into light of the three primary colors by using this type of structure. In addition, it is possible to separate white as color light from a light source into light of the three primary colors (red, green, blue) by using another known method.

High brightness and good color reproduction are required for an image displayed by the liquid crystal projector. The light source can be given as one of factors that determine the brightness of the liquid crystal projector image and its color reproduction.

Lamps such as a metal halide lamp, a xenon lamp, a halogen lamp, a low pressure mercury lamp, a high pressure mercury lamp, or a xenon flash tube are generally used for the light source of the liquid crystal projector.

The light emitted by each of the lamps has its own characteristic spectral distribution. The color of light emitted from a high pressure mercury lamp is a white color with a hint of yellowish green, and the brightness of the red color wavelength range is extremely low. If the light emitted from the high pressure mercury lamp is separated into the three primary colors (red, green, blue) of light, then the brightness of red color light will be considerably lower when compared to blue and green colored light.

Therefore, if the high pressure mercury lamp is used as is as the light source of the liquid crystal projector, in comparison with the desired color image, the image actually formed on the screen has a lower red color brightness relative to the brightnesses of blue and green colors.

When using the high color mercury lamp as the liquid crystal projector light source, a method of lowering the brightness of blue color and green color light contained in the white light from the high pressure mercury lamp to the same order as the brightness of the red color light using an optical system filter is conventionally performed. However, although the balance in brightness between the red, green, and blue colors of light becomes good, the overall brightness of the image displayed becomes low.

Further, in addition to the above method, a method of using light having a slightly shorter wavelength (orange color) than that of the color red as red colored light is conventionally performed in order to increase the brightness of the color red. In this case, however, even though the brightness becomes higher, the purity of the red color of the image displayed is low, and when a red color image is to be displayed, it gets displayed as orange in color and the reproduction deteriorates.

Not limited to the high pressure mercury lamp, the light emitted by other lamps such as the metal halide lamp, the xenon lamp, the halogen lamp, the low pressure mercury lamp, and the xenon flash tube which are generally used for the liquid crystal projector light source also possesses its own characteristic spectral distribution. Therefore, depending upon the light source, the image actually displayed on the screen has higher or lower brightness on any of the red, blue, or green colors compared to the desired image color. Further, in order to ensure balance in the brightnesses of red, blue, and green colors, the color purity of the light becomes low, so that the image color reproduction deteriorates, or the brightness of the entire image becomes lower.

SUMMARY OF THE INVENTION

Taking into account the above problems, an object of the present invention is to provide: a light source which can form an image having good balance in brightness between red, blue, and green colors, having high color purity of light, having high brightness overall, and displayed in well reproduced color on a screen; and a projector using the light source.

The present invention uses two or more lamps having differing light spectral distributions for a light source of a projector, in particular a liquid crystal projector. With the above structure, light with a wavelength range of low brightness emitted from one lamp is compensated by light emitted from the other lamp, and the light irradiated from the light source has good balance in brightness between red, blue, and green colors. The balance in brightness of red color, blue color, and green color light becomes good by the above structure, and it becomes possible to form an image having good color purity and high brightness overall on a screen.

For example, a lamp in which the red color brightness is lower than the brightnesses of blue and green colors, and a lamp in which the red color brightness is higher than that of blue and green colors are used as a single light source (light sources having the structure of the present invention are hereafter referred to as light source optical systems) in a liquid crystal projector. The red, blue, and green color brightness balance and the color reproduction, of an image displayed on a screen by the liquid crystal projector is improved, and the overall brightness of the image can be increased by the above structure.

The structure of the present invention is shown below.

According to the present invention, there is provided a light source optical system comprising a first lamp which emits a first light, a second lamp which emits a second light, and a condensing optical system which synthesizes the first light and the second light and forms irradiation light, characterized in that the first light and the second light have mutually differing spectral distributions.

According to the present invention, there is provided a light source optical system comprising a first lamp which emits a first light, a second lamp which emits a second light, a first lamp condensing system, a second lamp condensing system, and a condensing optical system, characterized in that:

the first light and the second light have mutually differing spectral distributions; and the first light and the second light, after being adjusted so as to have a uniform illumination distribution on an irradiation surface by the first lamp condensing system and the second lamp condensing system, respectively, are synthesized by the condensing optical system so as to become irradiation light.

According to the present invention, there is provided a light source optical system comprising a first lamp which emits a first light, a second lamp which emits a second light, and a condensing optical system, characterized in that:

the first light and the second light have mutually differing spectral distributions;

light having a specific wavelength range is separated from the first light by a means of light separation;

the brightness of the light having the specific wavelength range is adjusted by an optical system filter; and the brightness-adjusted light having the specific wavelength range and the second light are synthesized by the condensing optical system so as to become irradiation light.

According to the present invention, there is provided a light source optical system comprising a first lamp which emits a first light, a second lamp which emits a second light, a first lamp condensing system, a second lamp condensing system, and a condensing optical system, characterized in that:

the first light and the second light have mutually differing spectral distributions;

light having a specific wavelength range is separated from the first light by a means of light separation;

the brightness of the light having the specific wavelength range is adjusted by an optical system filter; and the brightness-adjusted light having the specific wavelength range and the second light, after being adjusted so as to have a uniform illumination distribution on an irradiation surface by the first lamp condensing system and the second lamp condensing system, respectively, are synthesized by the condensing optical system so as to become irradiation light.

The means of light separation may be a dichroic mirror.

The means of light separation may be a color filter.

The first lamp and the second lamp may be each one lamp selected from the group consisting of a halogen lamp and a high pressure mercury lamp.

According to the present invention, there is provided a three panels type liquid crystal projector having the above light source optical system.

According to the present invention, there is provided a single panel type liquid crystal projector having the above light source optical system.

According to the present invention, there is provided an overhead projector (OHP) having the above light source optical system.

DETAILED DESCRIPTION OF THE PREFERRED EMBODIMENTS

Embodiment Mode

Figure 1:
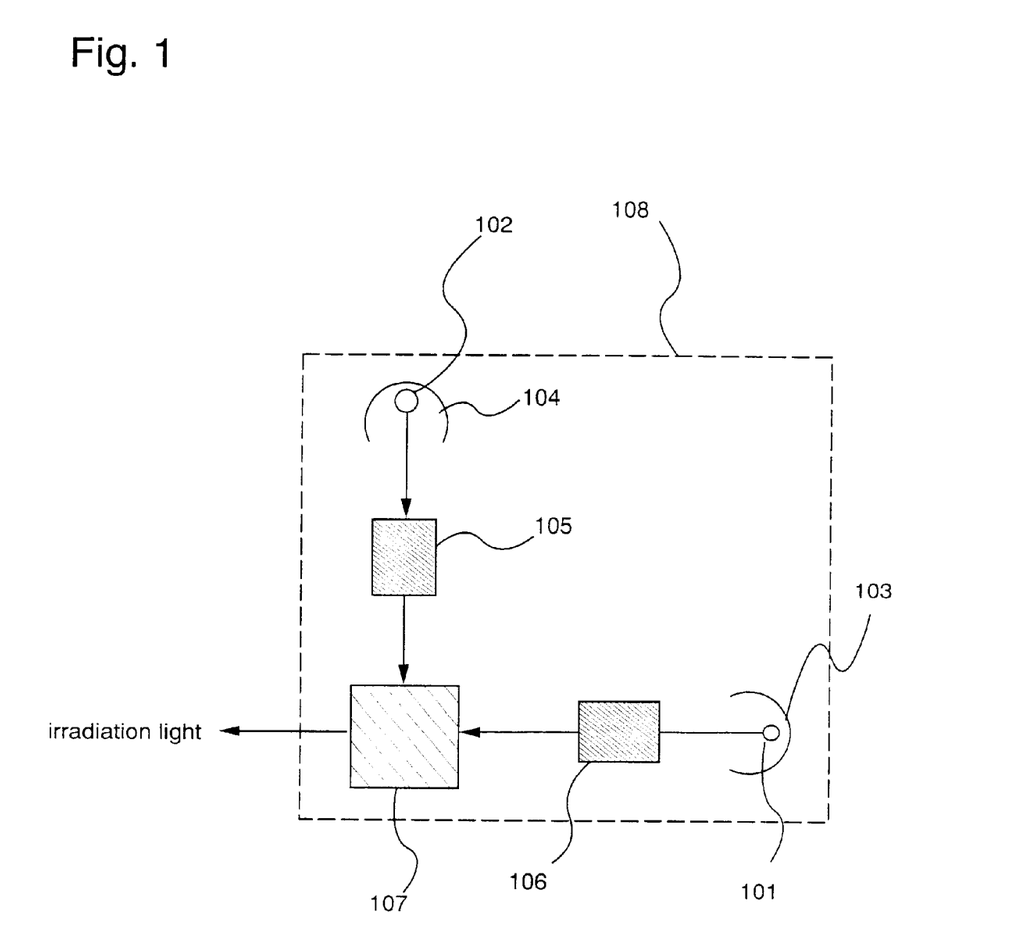
FIG. 1 is a diagram showing the configuration of a light source optical system of the present invention.

The structure of a light source optical system of the present invention is shown in FIG. 1. A high pressure mercury lamp 101 and a halogen lamp 102 are provided within a light source optical system 108.

Light from the high pressure mercury lamp 101 is condensed by a high pressure mercury lamp reflector 103, and is made incident on a high pressure mercury lamp condensing system 106.

Further, light from the halogen lamp 102 is condensed by a halogen lamp reflector 104, and is made incident on a halogen lamp condensing system 105.

The halogen lamp condensing system 105 and the high pressure mercury lamp condensing system 106 are optical systems which condense the light from the lamps, and perform adjustments so that the light has a uniform illumination distribution on an irradiation surface.

The light from the halogen lamp and the light from the high pressure mercury lamp, adjusted by the halogen lamp condensing system 105 and the high pressure mercury lamp condensing system 106, respectively, enter to a condensing optical system 107. The light from the high pressure mercury lamp and the light from the halogen lamp are synthesized in the condensing optical system 107, and are irradiated from the light source optical system 108 as irradiation light.

White light which is emitted from the high pressure mercury lamp and has low brightness in a specific wavelength range is compensated by light emitted from the halogen lamp by using the above structure, the brightness of red, blue, and green color of irradiation light emitted from the light source optical system becomes high, and the color purity balance of the light becomes good. The color reproduction of the image formed on the screen therefore becomes better, and further, the overall image brightness becomes higher when compared with the case of using one lamp as the light source.

Note that components such as an optical lens, a film having a polarization function, a film for regulating phase difference, and an IR film may be suitably provided by an operator in light paths shown by arrows in FIG. 1.

Furthermore, the light source optical system of the present invention is not limited to use as the light source of a liquid crystal projector, but it is also possible to use it as the light source of general projecting machine such as a slide projector or an overhead projector (OHP).

Embodiments of the present invention are explained below.

Embodiment 1

A three panels type liquid crystal projector using the light source optical system of the present invention shown in the embodiment mode is explained in Embodiment 1.

Figure 2:
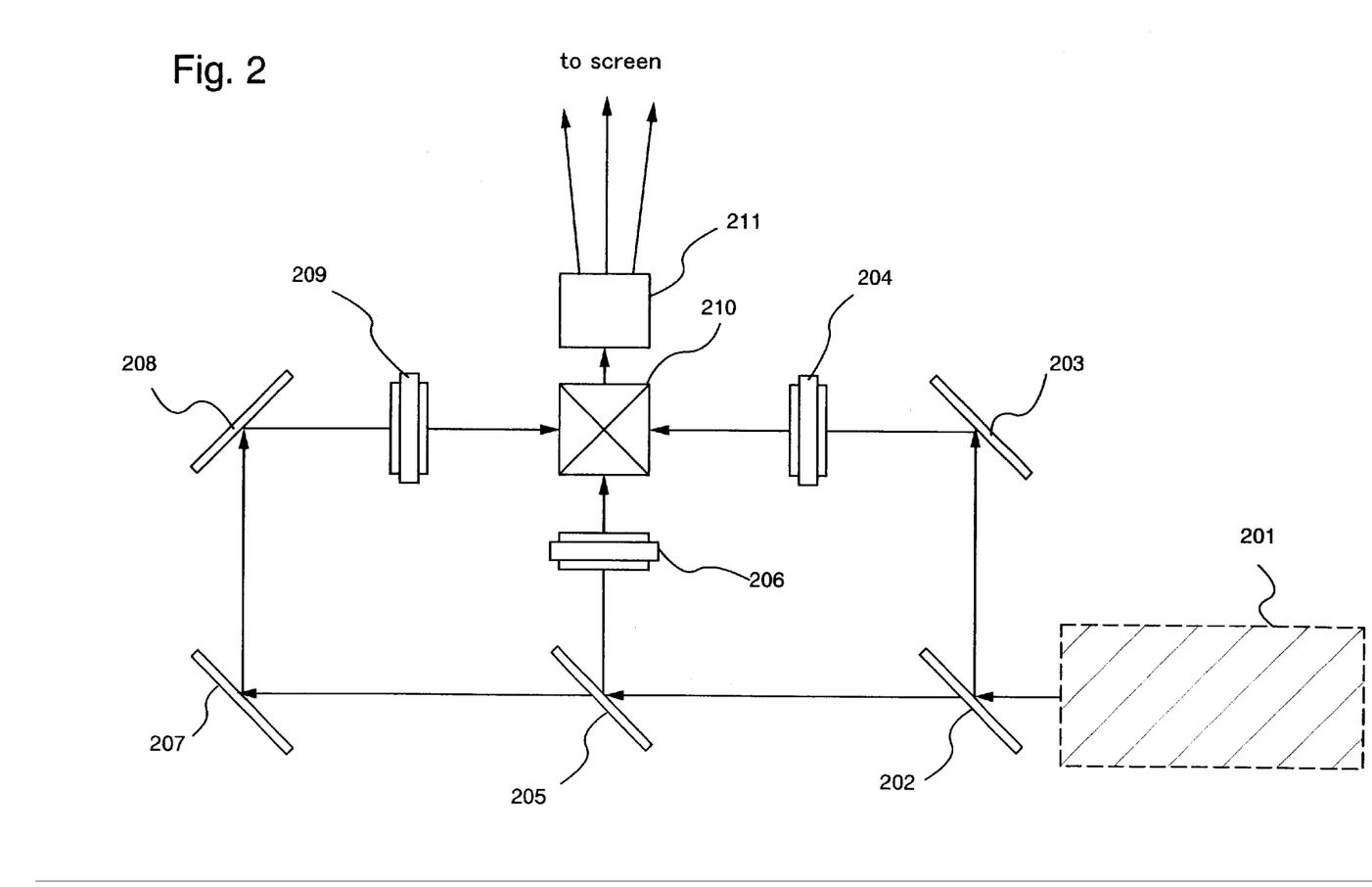
FIG. 2 is a diagram showing a three panels type projector using a light source optical system of the present invention.

A three panels liquid crystal projector of the present invention is shown in FIG. 2. A high pressure mercury lamp and a halogen lamp are used in a light source optical system 201 in Embodiment 1. Note that the present invention is not limited to the use of these two lamps. Irradiation light formed by combining light from the high pressure mercury lamp and light from the halogen lamp is irradiated from the light source optical system 201.

Light emitted from the high pressure mercury lamp and having a low brightness wavelength range is compensated by light emitted from the halogen lamp, and therefore the red, blue, and green color brightnesses of light emitted from the light source optical system 201, and it color purity balance, are good. The color reproduction of an image formed on a screen therefore becomes good, and the overall brightness of the image is increased.

The white color irradiation light irradiated from the light source optical system 201 enters to an R dichroic mirror 202. The R dichroic mirror 202 reflects only light with a red color (R) wavelength range from the white color irradiation light irradiated from the light source optical system 201.

The reflected red color (R) light is reflected by a total reflecting mirror 203, and enters to an R display panel 204. Note that a liquid crystal panel is used in the display panel in Embodiment 1. The red color irradiation light incident to the R display panel 204 is transmitted through the R display panel 204, and enters as red color output light to an output light synthesizing optical system 210. A dichroic prism is used as the output light synthesizing optical system 210 in Embodiment 1.

Light other than the red light reflected by the R dichroic mirror 202 enters to a G dichroic mirror 205.

The G dichroic mirror 205 reflects only light having a green (G) wavelength range, and other light is transmitted. The reflected green (G) light enters to a G display panel 206. Green color output light outputted from the G display panel 206 enters to the output light synthesizing optical system 210.

Light having a blue color (B) wavelength range, other than the green color light reflected by the G dichroic mirror 205 and the red light, is reflected by total reflecting mirrors 207 and 208, and enters to a B display panel 209. Blue color output light outputted from the B display panel 209 enters to the output light synthesizing optical system 210.

The red, green, and blue color output light incident to the output light synthesizing optical system 210 is collected together to one light stream by the output light synthesizing optical system 210, and is projected on the screen by a projecting optical system 211 (a projecting lens is used in Embodiment 1). Note that the projecting optical system 211 may also be composed of a plurality of optical lenses equipped with projecting lenses.

Two or more lamps thus mutually compensate for light having low brightness wavelength ranges with the present invention. In accordance with the above structure, there is good balance in the brightness and purity of red, blue, and green color light, and it becomes possible to form an image having good color reproducibility on a screen.

Embodiment 2

As An example of a light source optical system of the present invention differing from the example shown by the embodiment mode is shown in Embodiment 2.

Figure 3:
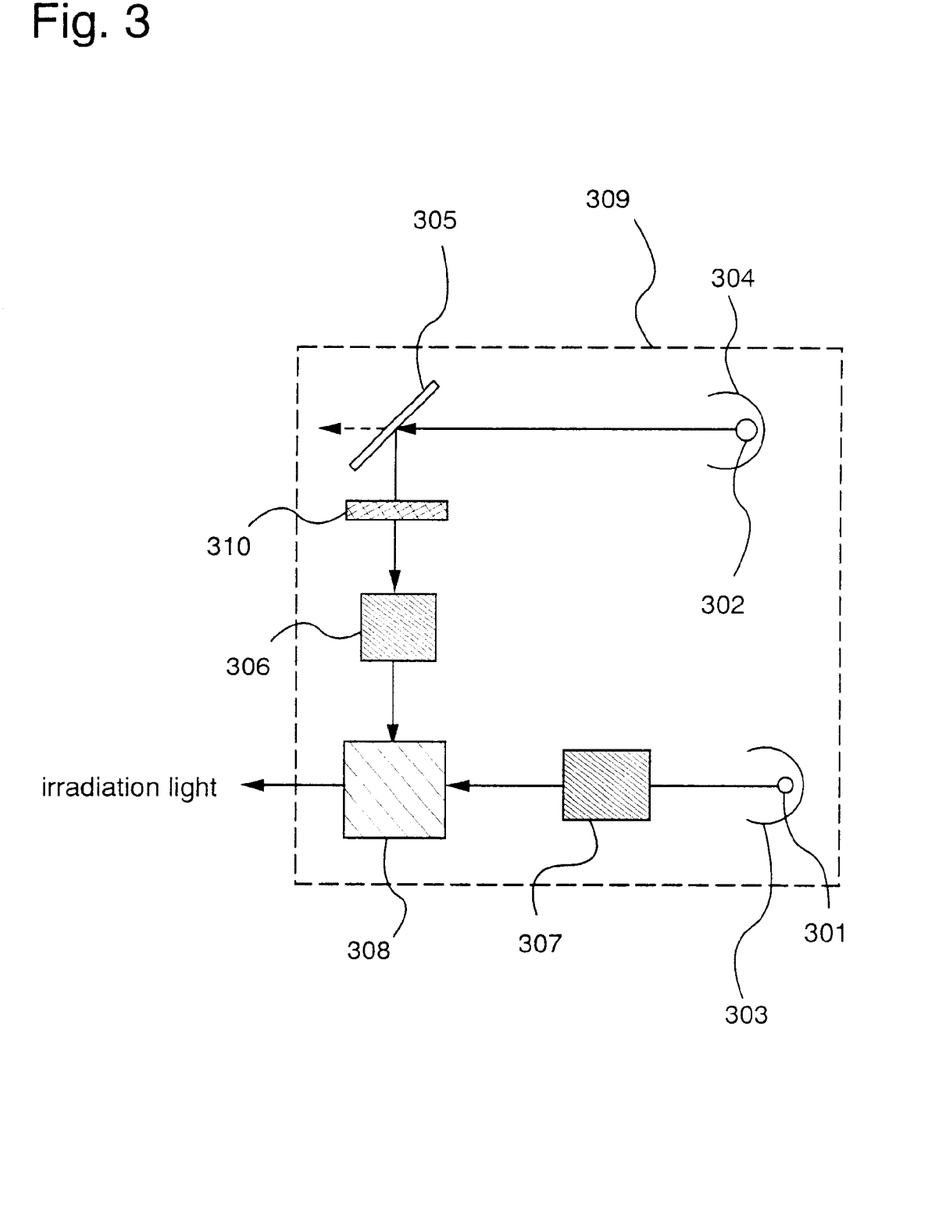
FIG. 3 is a diagram showing the configuration of a light source optical system of the present invention.

FIG. 3 shows a light source optical system of the present invention. A high pressure mercury lamp 301 and a halogen lamp 302 are formed within a light source optical system 309.

Light from the high pressure mercury lamp 301 is condensed by a high pressure mercury lamp reflector 303, and enters to a high pressure mercury lamp condensing system 307.

Further, light from the halogen lamp 302 is condensed by a halogen lamp reflector 304 and enters to a light source optical system R dichroic mirror 305. The light is separated by reflecting only the light having a red color wavelength range from the light emitted from the halogen lamp and enters to the light source optical system R dichroic mirror 305, and this enters to an optical system filter 310.

The red color light from the halogen lamp 302 is adjusted in brightness by the optical system filter 310. It is important to adjust the brightness of the red color light from the halogen lamp at this time so as to reduce the difference in the brightness between the light from the high pressure mercury lamp 301 in the red color wavelength range and the light in green and blue color wavelength regions.

The brightness-adjusted red color light from the halogen lamp then enters to a halogen lamp condensing system 306.

The halogen lamp condensing system 306 and the high pressure mercury lamp condensing system 307 are optical systems for condensing the light from the lamps and adjusting the light from the lamps so as to have a uniform illumination distribution on an irradiation surface.

The light from the halogen lamp 302 and the light from the high pressure mercury lamp 301, adjusted by the halogen lamp condensing system 306 and the high pressure mercury lamp condensing system 307, respectively, both enter to a condensing optical system 308. The light from the high pressure mercury lamp and the light from the halogen lamp are synthesized in the condensing optical system 308, and are irradiated from the light source optical system 309 as irradiation light.

White light emitted from the high pressure mercury lamp 301 and with a specific wavelength range having low brightness is compensated by light emitted from the halogen lamp 302 by using the above structure, the brightness of red, blue, and green color irradiation light emitted from the light source optical system 309 becomes high, and the color purity balance of the light becomes good. The color reproducibility of the image formed on the screen therefore becomes better, and further, the overall image brightness becomes higher when compared with the case of using one lamp as the light source.

Note that components such as an optical lens, a film having a polarization function, a film for regulating phase difference, and an IR film may be suitably provided in the paths shown by arrows in FIG. 3.

Further, when a lamp is used as the light source, in general the color of light emitted changes depending upon the temperature of the lamp. In addition to the properties of the lamp itself, the lamp temperature also changes depending upon the performance and the size of a fan formed in order to prevent overheating of the light source optical system by heat emitted from the lamp, the size of a fan hole, the temperature of the environment in which the light source optical system is placed. The color of light emitted by the lamp itself also differs depending upon how long the lamp continues to emit.

When the high pressure mercury lamp light and the halogen lamp light are synthesized as is, in order to obtain balance in the brightness of red, green, and blue colors from the synthesized irradiation light it is necessary to consider the balance in brightness of the red, green, and blue colors of light from the high pressure mercury lamp, and the balance in brightness of the red, green, and blue colors of light from the halogen lamp. If the color of light emitted from each of the two lamps changes slightly due to the temperature of the lamps, then it is difficult to get brightness balance between the red, green, and blue colors of the irradiation light obtained by combining the light from the two lamps.

Note that the light source optical system of Embodiment 2 has a structure in which only the red color wavelength range of light from the white light emitted from the halogen lamp is synthesized with the high pressure mercury lamp light.

When only red color light from the halogen lamp is added to the high pressure mercury lamp light, even if the color of light emitted by the high pressure mercury lamp and the halogen lamp changes depending upon the temperature, by adjusting only the brightness of the red color light from the halogen lamp using the optical system filter 310, balance between the brightnesses of red, blue, and green color irradiation light outputted from the light source optical system 309 can be achieved. It is therefore easier to achieve red, blue, and green color brightness balance in the irradiation light obtained by synthesizing the light from the two lamps with the light source optical system 309 shown by Embodiment 2, compared with the light source optical system shown in Embodiment 1.

Note that the halogen lamp and the high pressure mercury lamp are used as the light source optical system lamps in Embodiment 2, but there are no limitations placed on the present invention. Further, the irradiation light is obtained by synthesizing the light from one lamp with only the red color light from the other lamp in Embodiment 2, but the present invention may also synthesize only blue color light or only green color light from another lamp. Furthermore, the present invention is not limited to the example of synthesizing light from one lamp with only one color of light. Light from one lamp may also be synthesized with a two color combination of light from the other lamp, red and green colors, green and blue colors, or blue and red colors.

It is possible to use the light source optical system of Embodiment 2 in the three panels type projector shown by FIG. 2. Further, it is also possible to apply the light source optical system of Embodiment 2 as a light source of a projector having a structure other than that of the three panels type projector shown by FIG. 2.

Note that a fixed wavelength range of light is separated from the lamp light using the dichroic mirror in Embodiment 2, but there are no limitations on the present invention. Provided that it is a means capable of separating a fixed wavelength range of light out of lamp light, all such means can be used in the light source optical system of the present invention, and it is naturally possible to use a known means such as a color filter, instead of the dichroic mirror.

Embodiment 3

An example which differs from the three panels type projector used in the light source optical system of the present invention shown in Embodiment 1 is explained in Embodiment 3.

Figure 4:
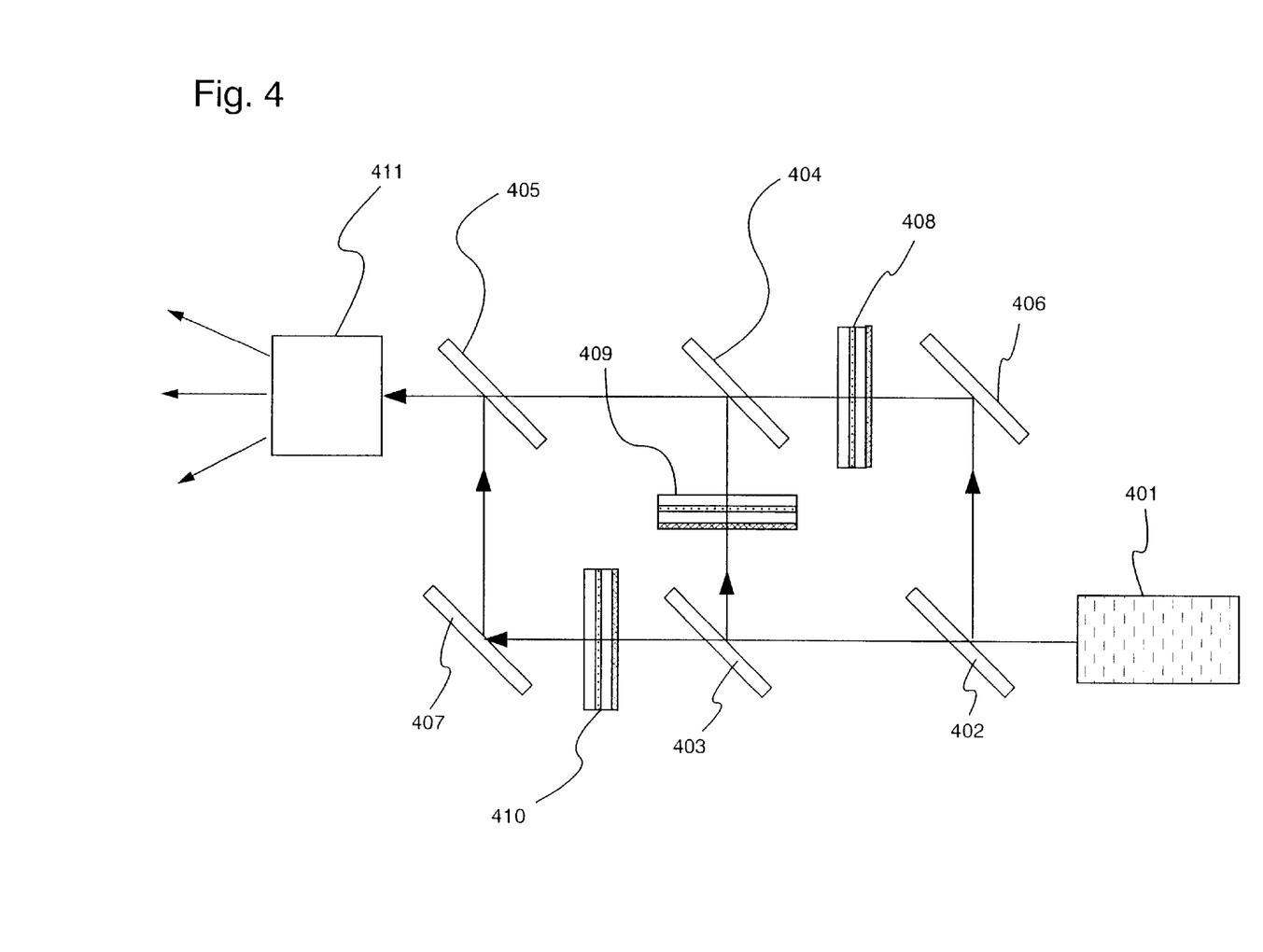
FIG. 4 is a diagram showing a three panels type projector using a light source optical system of the present invention.

Please refer to FIG. 4. FIG. 4 is a schematic diagram of a three panels type projector of Embodiment 3. Reference numeral 401 denotes a light source optical system of the present invention. The light source optical system of Embodiment 3 has the form shown by the embodiment mode and by Embodiment 2 of the present invention. White color irradiation light possessing a spectrum of red color, green color, and blue color wavelength ranges is irradiated from the light source optical system 401.

The white color irradiation light irradiated from the light source optical system 401 enters to an R dichroic mirror 402. Only the red color wavelength range of light from the irradiation light incident to the R dichroic mirror 402 is reflected. The red color light reflected in the R dichroic mirror 402 is then reflected by a total reflecting mirror 406, is transmitted through a R display panel 408, and becomes red color output light. The red color output light is then transmitted through a second G dichroic mirror 404 and a B dichroic mirror 405, and enters to a projecting optical system 411.

From the white color irradiation light irradiated from the light source optical system 401, the light not reflected in the R dichroic mirror 402 enters to a first G dichroic mirror 403. Only green color light is then reflected in the first G dichroic mirror 403, is transmitted through a G display panel 409, and becomes green color output light. The output light is then reflected in the second G dichroic mirror 404, is transmitted through the B dichroic mirror 405, and enters to the projecting optical system 411.

Light in a green color wavelength range which is not reflected in the first G dichroic mirror 403 is transmitted through a B display panel 410, and becomes blue color output light. The blue color output light is then reflected in a total reflecting mirror 407 and the B dichroic mirror 405, and enters to the projecting optical system 411. Red, green, and blue color output light is projected on a screen by a projecting lens in the projecting optical system 411. Note that the projecting optical system 411 may also be composed by a plurality of optical lenses equipped with projecting lenses.

A dichroic prism need not be used with the above structure, and therefore the price of the projector can be kept lower than for the case of Embodiment 1.

Embodiment 4

An example of using a single panel type liquid crystal projector in a light source optical system of the present invention is shown in Embodiment 4.

Figure 5A:
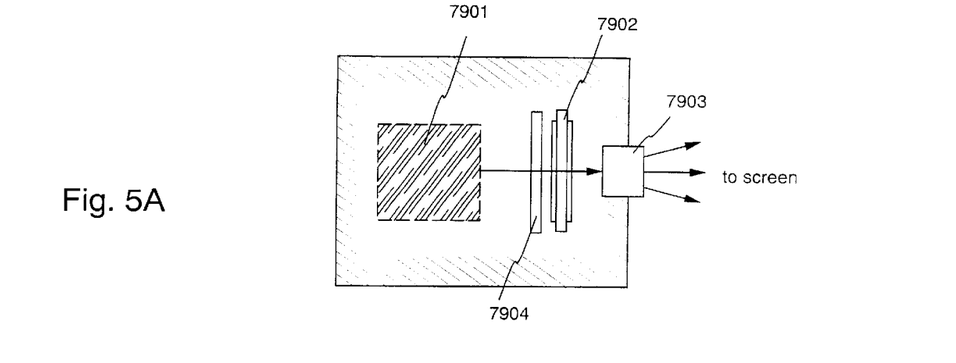
FIGS. 5A to 5C are diagrams showing single panel type projectors using a light source optical system of the present invention.

FIG. 5A is a diagram showing an example of a single panel type projector. The projector shown in FIG. 5A has a light source optical system 7901, a display panel (a liquid crystal panel in Embodiment 4) 7902, a projecting optical system 7903, and a phase difference plate 7904. Note that the light source optical system 7901 has the form shown in the embodiment mode or Embodiment 2 of the present invention. The projecting optical system 7903 is composed of a plurality of optical lenses equipped with projecting lenses. Note that the projecting optical system 7903 may also be composed of one projecting lens. Further, a color filter (not shown in the figure) is formed in the display panel 7902, colorizing a display image.

Figure 5B:
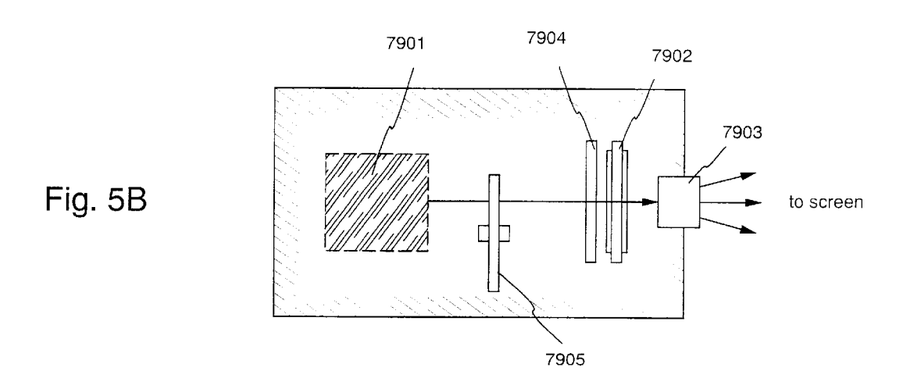

Further, a single panel type projector shown in FIG. 5B is a example application of FIG. 5A, and the display image is colorized by using an RGB rotating color filter disk 7905 as a substitute for forming the color filter in a pixel.

Figure 5C:
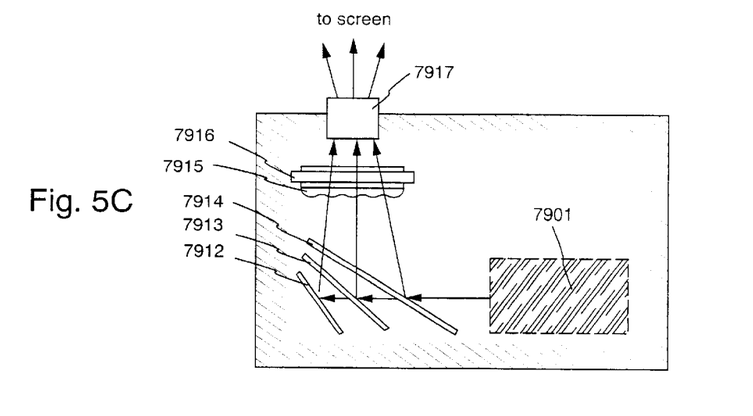

Furthermore, a single panel type projector shown in FIG. 5C is referred to as a color filterless single panel type projector. A micro lens array 7915 is formed in a display panel 7916, and a displayed image is colorized using a B dichroic mirror 7912, a G dichroic mirror 7913, and an R dichroic mirror 7914. A projecting optical system 7917 is composed of a plurality of optical lenses equipped with projecting lenses. Note that the projecting optical system 7917 may also be composed of one projecting lens.

The applicable range of the present invention is thus extremely wide, and it is possible to apply the present invention to all fields of electronic equipment.

Embodiment 5

A light source optical system of the present invention can be used in both a rear type projector and a front type projector. Examples of these are shown in FIGS. 6A and 6B.

Figure 6A:
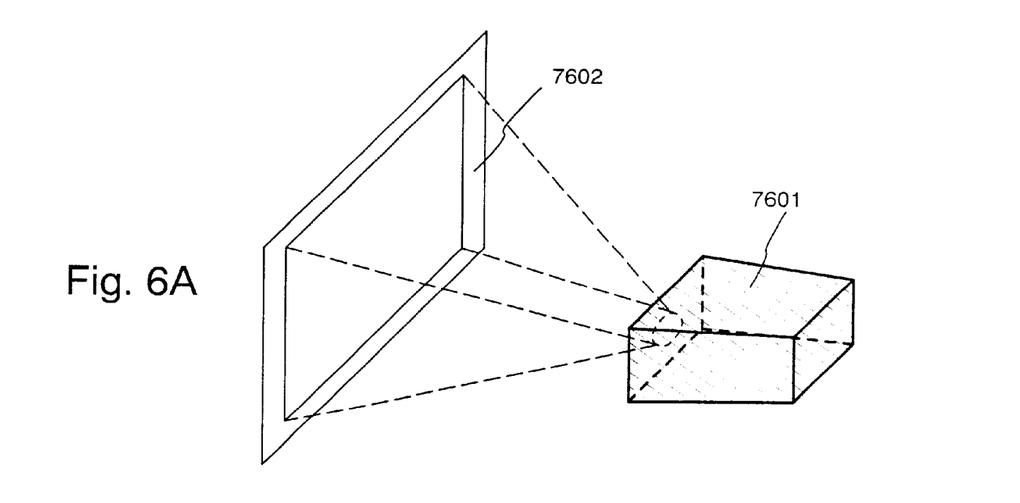
FIGS. 6A and 6B are diagrams showing a rear type projector and a front type projector, respectively, using a light source optical system of the present invention.

FIG. 6A shows a front type projector, which is composed of a display device 7601 having a light source optical system of the present invention, and a screen 7602.

Figure 6B:
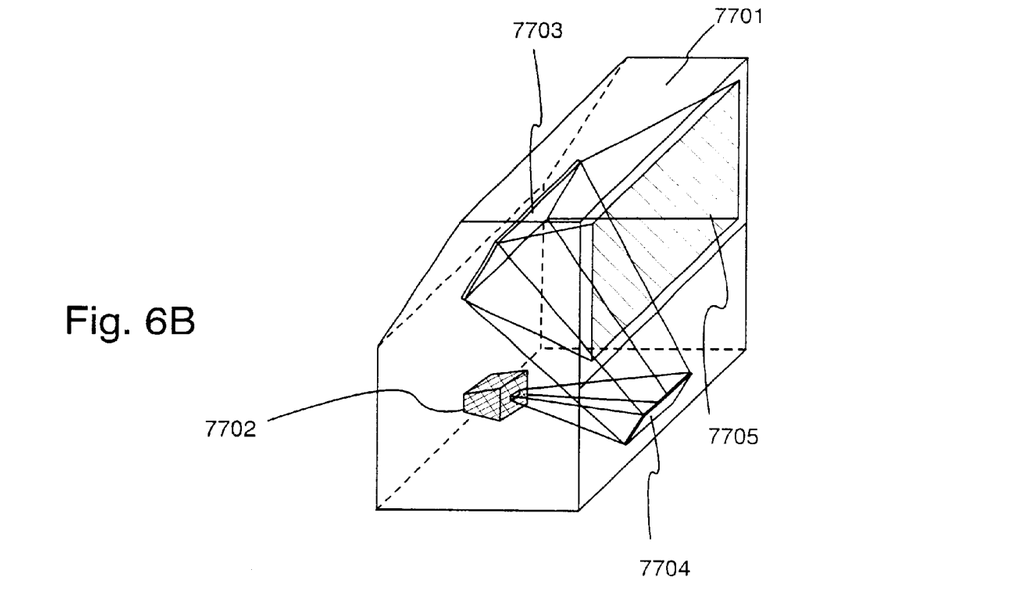

FIG. 6B shows a rear type projector, which is composed of a main body 7701, a display device 7702 having a light source optical system of the present invention, mirrors 7703 and 7704, and a screen 7705.

Note that the three panels type projector shown by FIG. 2 or FIG. 4 may be used in the display devices 7601 and 7702 in Embodiment 5, and that the single panel type projector shown by FIG. 5 may also be used. Further, the light source optical system shown in the embodiment mode or in Embodiment 2 of the present invention can also be used.

Embodiment 6

The structure of a condensing system used in a light source optical systems of the present invention is explained in Embodiment 6.

Figure 7A:
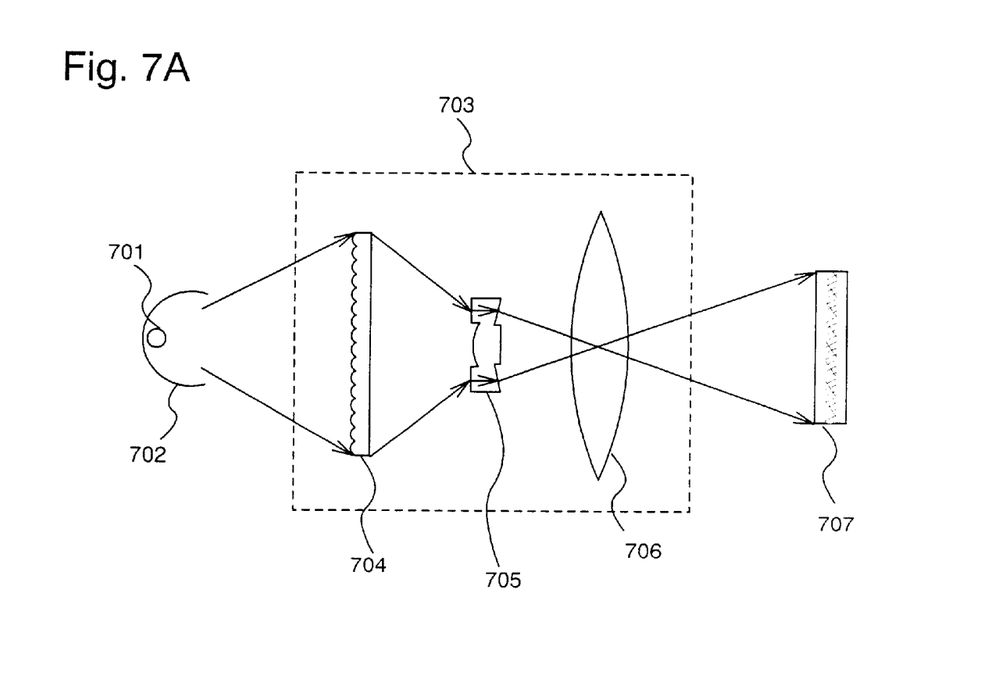
FIGS. 7A and 7B are diagrams showing examples of light condensing systems used in the present invention.

FIG. 7A shows a schematic diagram of a condensing system used in the present invention. A condensing system 703 has a first flyeye lens 704, a second flyeye lens 704, and a condenser lens 706. Light emitted from a lamp 701 is collected by a reflector 702, enters to the first flyeye lens 704 in which a plurality of small lenses are provided, to the second flyeye lens 705 in which a plurality of small lenses are provided, and to the condenser lens 706, in order, and then enters to a display panel 707.

By having the above structure, the condensing system 703 condenses light from the lamp 701 with good efficiency, and can adjust the light from the lamp 701 so as to have a uniform illumination distribution in an irradiation surface (in this case, denoting a surface on the incident light side of the display panel 707).

Another example of a condensing system used in the present invention is explained with reference to FIG. 7B.

Figure 7B:
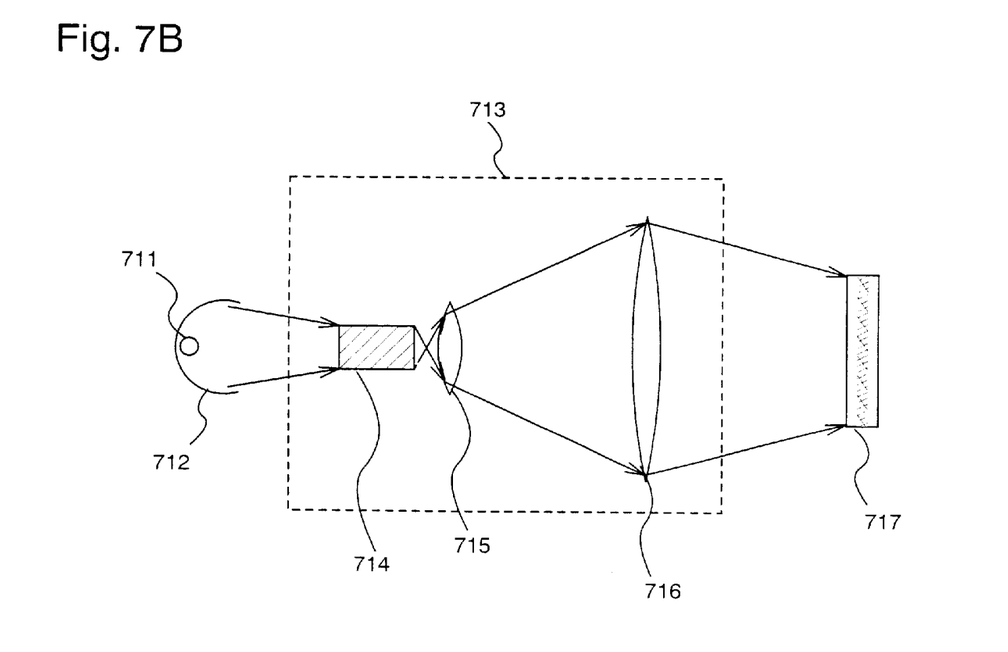

A condensing system 713 shown in FIG. 7B has a rod 714, a first condensing lens 715, and a second condensing lens 716. Light emitted from a lamp 711 is collected by a reflector 712 and enters to the rod 714. The light incident to the rod 714 is totally reflected within the rod 714, is outputted, and enters to the first condensing lens 715. The light incident to the first condensing lens 715 next enters to the second condensing lens 716, and to a display panel 717, in order.

By having the above structure, the condensing system 713 condenses light from the lamp 711 with good efficiency, and can adjust the light from the lamp 711 so as to have a uniform illumination distribution in an irradiation surface (in this case, denoting a surface on the incident light side of the display panel 717).

Note that a condensing optical system is omitted in FIGS. 7A and 7B, and that light outputted from the condensing system is directly irradiated to the display panel. However, in practice, light outputted from the condensing system enters to a condensing optical system, is combined with light from other light sources, and is then irradiated from the light source optical system as irradiation light. After then passing through optical systems such as a dichroic mirror, total reflecting mirror, or lens, it is irradiated to the display panel.

Note that the present invention is not limited to the above condensing system. It is possible to use any condensing system provided that it can condense light from the lamp with good efficiency, and that it can adjust the light from the lamp so as to have a uniform illumination distribution in the irradiation surface.

Embodiment 7

In addition to a nematic liquid crystal, it is also possible to use various other liquid crystals in a liquid crystal panel contained by the above liquid crystal projector of the present invention. For example, it is possible to use the liquid crystal materials disclosed in: Furue, H, et al., "Characteristics and Driving Scheme of Polymer-stabilized Monostable FLCD Exhibiting Fast Response Time and High Contrast Ratio with Gray-scale Capability," SID, 1998; Yoshida, T., et al., "A Full-color Thresholdless Antiferroelectric LCD Exhibiting Wide Viewing Angle with Fast Response Time," SID Digest, 841, 1997; Inui, S., et al., "Thresholdless antiferroelectricity in liquid crystals and its application to displays," J. Mater. Chem., 6(4), pp. 671–3, 1996; and U.S. Pat. No. 5,594,569.

Figure 8:
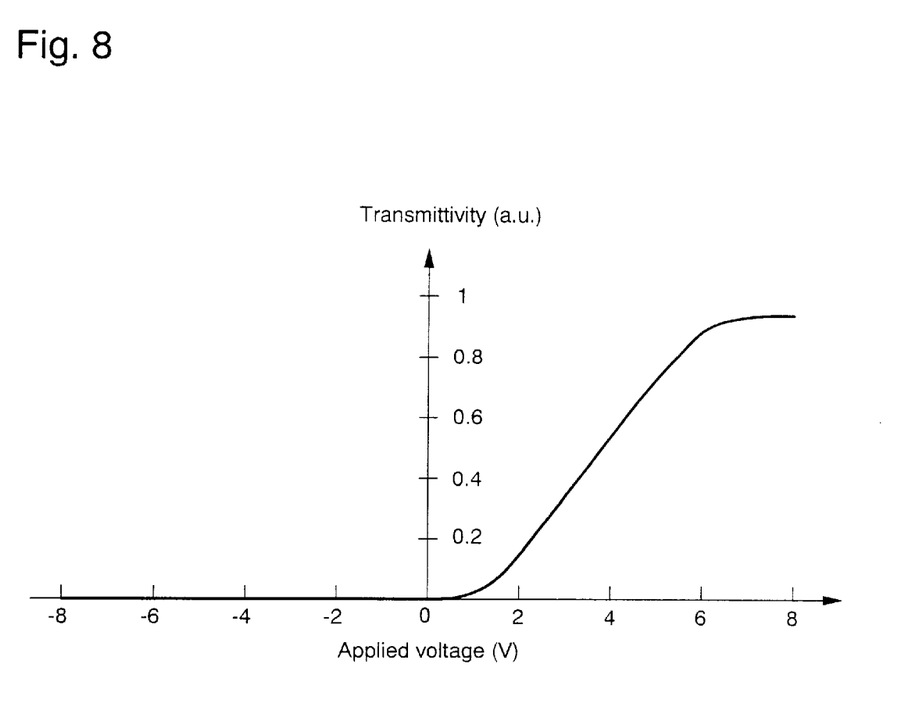
FIG. 8 is a diagram showing the electro-optic characteristics of a monostable FLC.

The electro-optical characteristics of a monostable ferroelectric liquid crystal (FLC), in which an FLC showing a phase transition system of an isotropic phase—cholesteric phase—chiralsmectic phase is used, and in which a phase transition is caused from the cholesteric phase to the chiralsmectic phase, a cone edge being made to nearly conform with a rubbing direction while applying a DC voltage, are shown in FIG. 8. The display mode of a ferroelectric liquid crystal like that shown in FIG. 8 is referred to as a "half-V switching mode." The vertical axis of the graph shown in FIG. 8 is the transmittance (in arbitrary units), and the horizontal axis is the applied voltage. Details regarding the "half-V switching mode" may be found in: Terada, et al, "Half-V Switching Mode FLCD", Proceedings of the 46th Japan Society of Applied Physics Lectures, Mar. 1999, p. 1316; and in Yoshihara, et al, "Time-Division Full Color LCD by Ferroelectric Liquid Crystal", Liquid Crystals, vol. 3, no. 3, p. 190.

As shown in FIG. 8, it is apparent that if this type of ferroelectric mixed liquid crystal is used, it becomes possible to have a low voltage drive and a gray scale display. A ferroelectric liquid crystal that shows these electro-optical characteristics can be used in the display device of the present invention.

In addition, a liquid crystal that exhibits an antiferroelectric phase in a certain temperature range is referred to as an anti-ferroelectric liquid crystal (AFLC). There are mixed liquid crystals, which have an anti-ferroelectric liquid crystal, that show electro-optical response characteristics in which the transmittance continuously changes in response to the electric field, and are referred to as thresholdless antiferroelectric mixed liquid crystals. There are thresholdless antiferroelectric mixed liquid crystals that show so-called V-type electrooptical response characteristics, and some have been found to have a drive voltage of approximately ±2.5 V (when the cell thickness is between 1 and 2 $\mu$m).

Further, in general the spontaneous polarization of a thresholdless antiferroelectric mixed liquid crystal is large, and the transmittance of the liquid crystal itself is high. It is thus necessary for a relatively large storage capacitor when a thresholdless antiferroelectric mixed liquid crystal is used for a liquid crystal display device. Therefore it is preferable to use a thresholdless antiferroelectric mixed liquid crystal that has a small spontaneous polarization.

Note that a low drive voltage can be realized by using this type of thresholdless antiferroelectric mixed liquid crystal in the liquid crystal display devices of the present invention, and therefore low power consumption can also be realized.

It becomes possible to form an image having good balance in brightness between red, blue, and green color of irradiation light, having high brightness overall, and having good color reproducibility, on a screen with the present invention by the above structure.

For example, a lamp in which the red color brightness is lower than the brightnesses of blue and green colors, and a lamp in which the brightness of red is higher than that of blue and green are used as a single light source in the light source of a liquid crystal projector. The brightness balance and the color reproducibility of red, blue, and green colors of the image displayed on the screen by the liquid crystal projector become better, and the overall image brightness becomes higher in accordance with the above structure.

What is claimed is:

1. A light source optical system comprising:
   a first lamp emitting a first light;
   a second lamp emitting a second light; and
   a condensing optical system synthesizing said first light and said second light and forming an irradiation light, wherein said irradiation light irradiates at least one display panel,
   wherein said first and said second light comprise different spectral distributions respectively; and
   wherein a light separation means comprising a color filter is on an optical path between said first lamp and said condensing optical system.

2. The light source optical system according to claim 1, wherein said first and said second lamp are each one lamp selected from the group consisting of a halogen lamp and a high pressure mercury lamp.

3. A three panels type liquid crystal projector comprising said light source optical system according to claim 1.

4. A single panel type liquid crystal projector comprising said light source optical system according to claim 1.

5. An overhead projector (OHP) comprising said light source optical system according to claim 1.

6. A light source optical system comprising:
   a first lamp emitting a first light;
   a second lamp emitting a second light;
   a first lamp condensing system for adjusting said first light;
   a second lamp condensing system for adjusting said second light; and
   a condensing optical system,
   wherein said first and said second light comprise different spectral distributions respectively,
   wherein said first and said second light are synthesized by the condensing optical system so as to be an irradiation light after being adjusted by said first and said second lamp condensing system respectively,
   wherein said irradiation light irradiates at least one display panel; and
   wherein a light separation means comprising a color filter is on an optical path between said first lamp and said first lamp condensing system.

7. The light source optical system according to claim 6, wherein said first and said second lamp are each one lamp selected from the group consisting of a halogen lamp and a high pressure mercury lamp.

8. A three panels type liquid crystal projector comprising said light source optical system according to claim 6.

9. A single panel type liquid crystal projector comprising said light source optical system according to claim 6.

10. An overhead projector (OHP) comprising said light source optical system according to claim 6.

11. A light source optical system comprising:
    a first lamp emitting a first light;
    a second lamp emitting a second light; and
    a condensing optical system,
    wherein said first and said second light comprise different spectral distributions respectively,
    wherein a light having a specific wavelength range is separated from said first light by a light separation means;
    wherein a brightness of said light having the specific wavelength range is adjusted by an optical system filter,
    wherein said brightness-adjusted light having the specific wavelength range and said second light are synthesized by said condensing optical system so as to be an irradiation light,
    wherein said irradiation light irradiates at least one display panel, wherein said light separation means comprises a color filter, and wherein said light separation means is on an optical path between said first lamp and said optical system filter.

12. The light source optical system according to claim 11, wherein said first and said second lamp are each one lamp selected from the group consisting of a halogen lamp and a high pressure mercury lamp.

13. A three panels type liquid crystal projector comprising said light source optical system according to claim 11.

14. A single panel type liquid crystal projector comprising said light source optical system according to claim 11.

15. An overhead projector (OHP) comprising said light source optical system according to claim 11.

16. A light source optical system comprising:

a first lamp emitting a first light;

a second lamp emitting a second light;

a first lamp condensing system for adjusting said first light;

a second lamp condensing system for adjusting said second light; and a condensing optical system, wherein said first and said second light comprise different spectral distributions respectively, wherein a light having a specific wavelength range is separated from said first light by a light separation means;

wherein a brightness of the light having the specific wavelength range is adjusted by an optical system filter, wherein said brightness-adjusted light having the specific wavelength range and said second light are synthesized by said condensing optical system so as to be an irradiation light after being adjusted by said first and said second lamp condensing system respectively, and wherein said irradiation light irradiates at least one display panel, wherein said light separation means comprises a color filter, and wherein said light separation means is on an optical path between said first lamp and said optical system filter.

17. The light source optical system according to claim 16, wherein said first and said second lamp are each one lamp selected from the group consisting of a halogen lamp and a high pressure mercury lamp.

18. A three panels type liquid crystal projector comprising said light source optical system according to claim 16.

19. A single panel type liquid crystal projector comprising said light source optical system according to claim 16.

20. An overhead projector (OHP) comprising said light source optical system according to claim 16.

21. A light source optical system comprising:

a first lamp emitting a first light, wherein said first lamp comprises a high pressure mercury lamp;

a second lamp emitting a second light, wherein said second lamp comprises a halogen lamp; and a condensing optical system synthesizing said first light and said second light and forming an irradiation light, wherein said irradiation light irradiates at least one display panel, wherein a light separation means comprising a color filter is on an optical path between said second lamp and said condensing optical system.

22. A three panels type liquid crystal projector comprising said light source optical system according to claim 21.

23. A single panel type liquid crystal projector comprising said light source optical system according to claim 21.

24. An overhead projector (OHP) comprising said light source optical system according to claim 21.

25. A light source optical system comprising:

a first lamp emitting a first light, wherein said first lamp comprises a high pressure mercury lamp;

a second lamp emitting a second light, wherein said second lamp comprises a halogen lamp;

a first lamp condensing system for adjusting said first light;

a second lamp condensing system for adjusting said second light; and a condensing optical system, wherein said first and said second light are synthesized by the condensing optical system so as to be an irradiation light after being adjusted by said first and said second lamp condensing system, respectively, and wherein said irradiation light irradiates at least one display panel, wherein a light separation means comprising a color filter is on an optical path between said second lamp and said second lamp condensing system.

26. A three panels type liquid crystal projector comprising said light source optical system according to claim 25.

27. A single panel type liquid crystal projector comprising said light source optical system according to claim 25.

28. An overhead projector (OHP) comprising said light source optical system according to claim 25.

* * * * *